United States Patent Office 3,422,124
Patented Jan. 14, 1969

3,422,124
TWO STAGE POLYMERIZATION OF UN-
SATURATED FATTY ACIDS
John Edward Milks, Stamford, and Natalie Hetman Conroy, New Canaan, Conn., assignors to Arizona Chemical Company, New York, N.Y., a corporation of Delaware
No Drawing. Continuation-in-part of application Ser. No. 405,846, Oct. 22, 1964. This application Dec. 12, 1967, Ser. No. 689,794
U.S. Cl. 260—407                         6 Claims
Int. Cl. C09f 7/06

ABSTRACT OF THE DISCLOSURE

A polymerization reaction in two stages is provided which comprises: first, polymerizing monomeric higher fatty acids employing an anhydrous acid menstruum at a temperature ranging from 180° C. to 260° C., separating the resultant polymeric acids from the reaction mixture to recover a monomeric fraction and, second, polymerizing at a temperature between 220° C. and 260° C., the said monomeric fraction with acid-treated mineral clay in an aqueous environment so as to obtain a ratio of dimer to trimer acid of at least 4.5 to 1, respectively.

---

This application is a continuation-in-part of copending application, Ser. No. 405,846, filed Oct. 22, 1964.

The present invention relates to a novel procedure whereby fatty acids found in various oils, such as for instance, tall oil and soyabean oil, are polymerized so as to obtain a mixture rich in dimeric fatty acids. More particularly, it relates to a method for polymerizing unsaturated fatty acids, utilizing stepwise catalytic reactions wherein the initial reaction is carried out under substantially anhydrous conditions.

As is known, monomeric unsaturated fatty acids which are derived from natural sources are capable of being polymerized to the dimerized and trimerized form. This is usually realized by subjecting such unsaturated fatty acids to the action of a mineral clay and, preferably an acid-treated mineral clay, at temperatures in excess of about 180° C. in an aqueous environment under autogenous pressure. Small amounts of water are deemed necessary for reaction to minimize the degradation of the fatty acids being treated. Attention is directed to United States Letters Patent Nos. 2,793,219 and 2,793,220 which detail this procedure.

Unfortunately, the known polymerization techniques are not wholly successful in preparing mixtures of dimeric fatty acids in high, commercially satisfactory yields. This is because trimeric fatty acids are substantially prepared and recovered monomeric fatty acids cannot be subsequently polymerized resulting in over-all loss in yield of polymeric fatty acids. Usually, however, polymeric fatty acids as prepared in the prior practice are present in amounts of less than about 60% by weight, based on the monomeric acids being treated. Of the less than 60% yield which has been further observed, again less than about 75% of the polymerized fatty acids are present in the dimeric form. If a method which insures the production of decreased yields of monomeric and trimeric fatty acids with attendant increased yields of dimeric fatty acids could be provided, such a procedure would constitute a significant advance in that a long-felt need would be satisfied.

It has been unexpectedly found that mixtures rich in dimeric fatty acids can be realized when utilizing acid-treated mineral clays under substantially anhydrous conditions in the polymerization of unsaturated fatty acids. Monomeric fatty acid fractions which are separated from resultant polymeric fatty acids can surprisingly be further polymerized employing acid-treated mineral clays per se. A second fraction rich in dimeric acids is again obtained to obtain an over-all increase in yield of this highly desired fraction.

According to the process of the present invention, substantial over-all increases in yield of polymeric fatty acids containing a relatively high ratio of dimeric acids to trimeric acids are obtained by the recognition of two critical operations. These involve the initial polymerization of fatty acids in a substantially anhydrous medium containing (a) glacial acetic acid, anhydrous propionic acid or anhydrous butyric acid, (b) an acid-treated mineral clay catalyst and (c) unsaturated fatty acids. The latter mixture is heated at temperatures ranging from about 180° C. to 260° C. under atmospheric or autogenous pressure for a period of from one to six hours. The mixture is cooled to about 120° C. and filtered to remove the clay catalyst and to recover a fatty acid mixture. Upon vacuum distillation, monomeric fatty acids are separated from the polymeric fatty acids. Resultant monomeric fatty acids are further polymerized in an aqueous environment containing an acid-treated mineral clay at temperatures between 220° C. and 260° C. under autogenous pressure. The reaction is then cooled to a temperature of about 110° C. to 130° C. and resultant fatty acids are again separated so as to recover a polymeric fatty acid mixture, which, when added to the polymeric fatty acids obtained previously in the first polymerization step, amounts to more than about 70% by weight of the fatty acids originally treated. Surprisingly, however, the mixture of polymeric acids contains predominantly dimeric fatty acids to the extent of about 4.5 parts of dimeric fatty acids to 1 part of trimeric and other polymeric fatty acids.

The fatty acids contemplated herein to be polymerized are naturally occurring mixtures of monounsaturated and polyunsaturated fatty acids. Exemplary of monounsaturated acids are: oleic acid, elaidic acid or palmitoleic acid. Examples of polyunsaturated acids are: linoleic acid and linolenic acid. Mixtures of both monounsaturated acids and polyunsaturated acids are exemplified by tall oil fatty acids and soyabean fatty acids, each of which contains less than about 7% conjugated unsaturation and having chain lengths of not less than 12 carbon atoms, usually between 16 and 22 carbon atoms.

The acid-treated mineral clay catalysts which are employed in both polymerization steps are readily available commercially and prepared from those illustrative mineral clays, such as hectorite, montmorillonite, attapulgite, sepiolite, bentonite per se or in combination with montmorillonite. Exemplary of one such acid-treated clay is commercially available "Super Filtrol," manufactured by the Filtrol Corporation. Each of the clay catalysts, however, are air-dried so as to insure the removal therefrom of all occluded moisture prior to their use in the initial polymerization step.

The initial polymerization environment should be maintained substantially free from moisture. To insure that the anhydrous medium is maintained, there is added a lower alkanoic acid, such as glacial acetic acid, n-propionic acid and n-butyric acid as well as isomers of the same. Resultant reaction mixture comprises at least 30% polymeric fatty acids which are predominantly dimeric fatty acids and useable monomeric fatty acids comprise the remainder. Separation of the latter monomeric acids from the polymeric acids is readily accomplished by vacuum distillation. Surprisingly, monomeric acids recovered can be subsequently polymerized utilizing an acid-treated mineral clay in an aqueous medium containing from 0.5% to 5% water whereby polymerization is accomplished at temperatures ranging from 220° C. and 260° C. under autogenous pressure. More than 50% of the latter monomeric fatty acids treated are converted to a polymeric fatty acid mixture of which more than 75% consists of dimeric fatty acids. Consequently, the overall yield of polymeric acids is greater than 70% of which more than 50% consists of dimeric fatty acids.

To determine the relative amounts of the several components present in the mixture, a gas chromatography procedure is advantageously employed. Typical of one such procedure is a method described in Analytical Chemistry, vol. 33 at page 363. The polymerization mixture is converted to the corresponding methyl esters employing boron trifluoride and methyl alcohol reagents. A standard, such as di(2-ethylhexyl)sebacate, is added to the esters and the mixture then is injected into the chromatograph which is programmed from 200° C. to 325° C. through a 12″ column containing 5% silicone grease on a 60/80 mesh chromasorb ω. The inlet temperature of the gas chromatography apparatus is maintained at 330° C. and the detector temperature is set at 300° C. The mixture to be analyzed is next fed into and passed through the aforementioned column. Monomeric fatty acids and dimeric fatty acids are calculated from the standard sebacate ester. Trimeric and other polymeric fatty acids are calculated by difference.

The following examples will illustrate the procedure of the present invention in greater detail. These are merely illustrative and not to be deemed limitative of the invention. The parts given are by weight unless otherwise specified.

EXAMPLE 1

To a suitable pressure reaction vessel containing 100 parts of tall oil fatty acids whose iodine value is 129 and whose acid number is 198 are admixed with 100 parts of glacial acetic acid and 3.8 parts of acid-treated montmorillonite clay. The mixture is agitated and heated at a temperature of 240° C. for 4 hours. The mixture is next cooled to about 120° C. to separate by filtration the clay therefrom. Thereafter the glacial acetic acid is removed from the reaction mixture under reduced pressure. The mixture is subsequently steamed stripped so as to remove residual traces of acetic acid. Resultant mixture, substantially free from occluded acetic acid, is thereafter analyzed in accordance with gas chromatographic analysis and is found to contain 63.5 parts of monomeric fatty acids and the remainder constituting dimeric and higher polymeric fatty acids. On analysis, the ratio of dimeric acids to trimeric and other polymeric acids found in the polymeric mixture is about 2 to 1, respectively.

Recovered monomeric acids obtained by vacuum distilling the polymeric fatty acid mixture above is thereafter subjected to further polymerization by adding thereto 2% water and 4% acid-treated montmorillonite clay. The mixture is placed in a rocking type autoclave and heated for four hours at 240° C. Thereafter, the mixture is cooled to approximately 120° C. and separated from the clay. On analysis by gas chromatography, the mixture contains an additional 56% of both dimeric and trimeric fatty acids and the remainder, by difference, constitutes 44% monomeric acids. Based on the weight of the monomeric fatty acids polymerized in the second polymerization step, there is recovered 36.6% polymerized fatty acids which are added to the 34.5% polymeric fatty acids recovered previously in the first step. Consequently, the overall yield obtained is greater than 71% of which substantially more than 50% constitutes dimeric fatty acids.

EXAMPLE 2

The procedure of Example 1 is repeated in every detail except that the first polymerization step is omitted. There is obtained 40.7% monomeric fatty acids and a 59.3% mixture of dimeric and trimeric fatty acids of which 40.8% is present as dimeric fatty acids. Although the ratio of dimer to trimer in this mixture is approximately 2 to 1, respectively, the fact is that further polymerization of recovered monomeric fatty acids cannot be effected under ordinary conditions.

EXAMPLE 3

To a suitable rocking type autoclave containing 100 parts of tall oil fatty acids having an iodine value of 129 and an acid number of 198 are added 25 parts of glacial acetic acid and 4 parts of acid-treated montmorillonite clay. The reactor is then agitated and heated at 240° C. for 4 hours under autogenous pressure. Upon completion of the reaction, the contents in the reactor are cooled to 120° C. and filtered. Analyzing the mixture by gas chromatography, a yield of 65.2% monomeric fatty acids is obtained. There is also obtained 35.6% dimeric fatty acids and no trimeric and other polymeric fatty acids.

Resultant monomeric fatty acids are thereafter polymerized employing 4% montmorillonite clay in the acid form and 2% by weight of water based on the monomeric acids to be polymerized. A temperature of 240° C. for 4 hours under autogenous pressure is employed to effect polymerization of these monomeric acids. There is finally recovered approximately 44% monomeric fatty acids of which the 56% remainder comprises 35% dimeric fatty acids and 21% trimeric fatty acids. An overall yield of more than 70% polymeric fatty acids of which the dimeric fatty acids to trimeric fatty acids and other polymeric acids ratio is 4.5 to 1.

EXAMPLE 4

The procedure of Example 3 is repeated in every detail except that (a) propionic acid and (b) n-butyric acid are employed separately in lieu of glacial acetic acid with similar attendant increased dimeric fatty acid yields.

EXAMPLE 5

The procedure of Example 3 is followed in every detail except that (a) soya-bean fatty acids are employed in lieu of the tall oil fatty acids mixture. Similarly, yields in excess of 70% polymeric acid in which a ratio in excess of 4.5 to 1 of dimeric fatty acids to trimeric fatty acids is obtained.

We claim:
1. In a process for the polymerization of unsaturated higher fatty acids in the presence of an acid-treated mineral clay and for from 0.5% to 5% water under autogenous pressure and temperatures ranging from between 180° C. and about 300° C. for from 1 to 6 hours, the improvement which consists essentially in the steps of: subjecting an unsaturated higher fatty acid material selected from the group consisting of tall oil fatty acids and soya bean fatty acids to the action of an acid-treated mineral clay at temperatures between about 180° C. and 260° C. for from 1 to 6 hours in a substantially anhydrous acid menstruum selected from the group consisting of glacial acetic acid, propionic acid and butyric acid; cooling the reaction mixture to separate therefrom the mineral clay and resultant higher fatty acids mixture; vacuum distilling the latter higher fatty acids mixture to separate monomeric higher fatty acid from polymeric acids; subjecting the monomeric higher fatty acids so-recovered to the action of an acid-treated mineral clay under autogenous pressure at temperatures ranging from 220° C. and 260° C. for from 1 to 6 hours in an aqueous environment; cooling the reaction mixture; separating the clay from resultant higher fatty acids mixture; and thereafter separating the polymeric higher fatty acids from the monomeric fatty acids whereby dimeric higher fatty acids and trimeric fatty acids ratio in the over-all polymeric higher fatty acids mixture exceeds about 4.5 to 1, respectively.

2. A process according to claim 1 in which the fatty acids treated are tall oil fatty acids.

3. A process according to claim 1 in which the fatty acids treated are soyabean fatty acids.

4. A process according to claim 1 in which the anhydrous menstruum constitutes glacial acetic acid.

5. A process according to claim 1 in which the anhydrous menstruum constitutes n-propionic acid.

6. A process according to claim 1 in which the anhydrous menstruum constitutes n-butyric acid.

References Cited

UNITED STATES PATENTS 3,059,003   10/1962   Rowe _____ 260—407

NICHOLAS S. RIZZO, *Primary Examiner.*

R. J. GALLAGHER, *Assistant Examiner.*